Sept. 16, 1958 T. McL. JASPER 2,852,295
CLAMP RING SUSPENSION
Filed Aug. 31, 1956
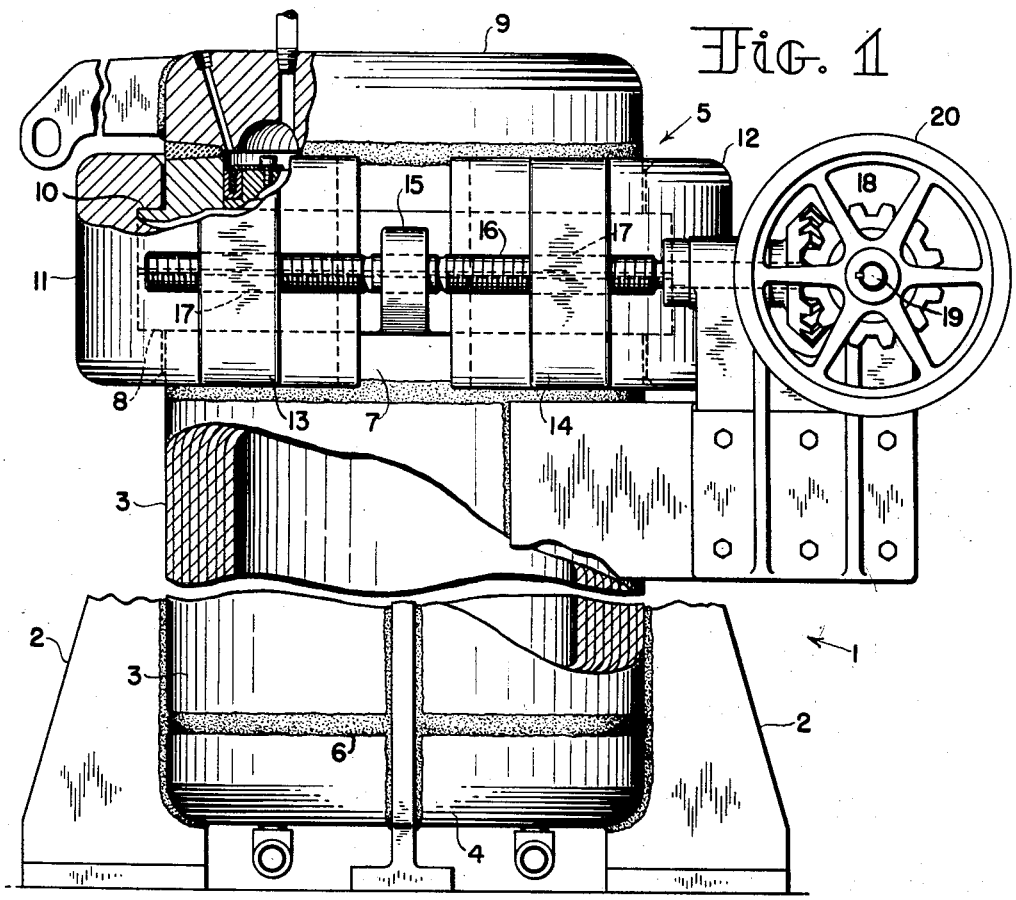
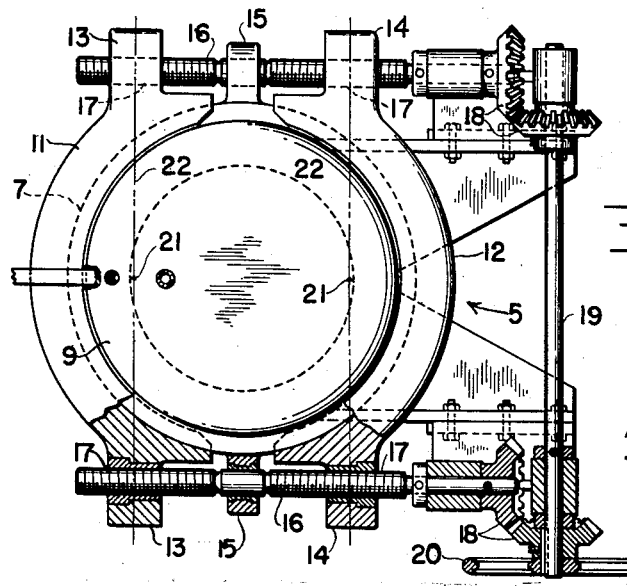
INVENTOR.
THOMAS McLEAN JASPER
BY
Andrus & Sceales
Attorneys

United States Patent Office 2,852,295
Patented Sept. 16, 1958

2,852,295
CLAMP RING SUSPENSION

Thomas McLean Jasper, Milwaukee, Wis., assignor to A. O. Smith Corporation, Milwaukee, Wis., a corporation of New York Application August 31, 1956, Serial No. 607,472

1 Claim. (Cl. 292—256.67)

This invention relates to a clamp ring suspension and more particularly to a clamp ring suspension for use with pressure vessel closures and the like.

The invention is an improvement over the structure disclosed in Needham et al. Patent No. 2,166,999. In that patent, a multi-layer pressure vessel was provided with an end closure comprising a flanged ring welded to the end of the vessel wall, and a flanged head. The flanges of the ring and head were held together and the vessel closed by a pair of semicircular clamps. A radially outwardly extending projection was disposed at each arcuate end of each clamp which allowed the clamps to be mounted for relative movement on a pair of threaded spindles running through the projections.

Difficulties have arisen with the above described construction, especially when the vessel was placed in a position other than horizontal. It was found that when the clamp rings were to be threadably moved on the spindles in opening or closing the vessel closure, substantial binding would occur between the rings and spindles. Since a pressure vessel often weighs many tons, this binding created a substantial problem which has not heretofore been successfully solved.

The present invention effectively overcomes the above-described difficulty in a novel manner without requiring a substantial reconstruction of the closure.

The accompanying drawings illustrate the best mode presently contemplated by the inventor for carrying out the invention.

In the drawings:

Figure 1 is a side elevation of a vertically disposed pressure vessel, partly in section; and Fig. 2 is a top plan view of the vessel, partly in section, showing the closure and clamp ring operating mechanism.

As shown in the drawings, the invention may be embodied in a pressure vessel 1 disposed vertically and secured by suitable supports 2. Vessel 1 comprises a multi-layer cylindrical wall portion 3 closed at one end by a closure 4 and at the other end by a closure 5. Closure 4 may be of any suitable construction and is shown as a head joined to the end of wall 3 by a girth weld 6.

Closure 5 is shown as comprising an end ring 7 welded to the other end of wall 3. Ring 7 is provided with a radially outwardly extending flange 8. A head member 9 is disposed to close the vessel and is provided on its inner end with a radially outwardly extending flange 10. Flange 10 is placed in facing relationship with flange 8.

Head 9 is secured to end ring 7 and thus to vessel 1 by a pair of clamps 11 and 12 which are substantially semicircular and are channel-like in shape to receive and hold flanges 8 and 10 together.

As best shown in Fig. 2, each clamp 11 and 12 is provided on its outer circumference with a pair of outwardly extending projections or bosses, 13 and 14 respectively. Each boss 13 on clamp 11 is separated from a corresponding boss 14 on clamp 12 by a bearing member 15 which is secured to end ring 7.

A spindle 16 is mounted for rotation in each bearing 15 and is threadably received in aligned openings 17 centrally disposed in bosses 13 and 14. Either clamp may have right hand threaded boss openings while the other clamp has left hand threaded boss openings.

As disclosed in the Needham et al. patent referred to above, the spindles 16 may be rotated to tighten or release clamps 11 and 12 on flanges 8 and 10 by means of beveled gears 18, cross shaft 19 and hand wheel 20.

Bosses 13 and 14 are spaced circumferentially a predetermined distance from the arcuate ends of their respective clamps 11 and 12, and the bosses and bearings 15 extend outwardly a sufficient distance so that the clamps do not interfere with passage of spindles 16 through openings 17.

The distance of set-back of bosses 13 and 14 is determined by the center of gravity of each clamp, indicated in the drawings as the points 21. Bosses 13 are so placed that a vertical plane 22 disposed normal to spindles 16 and parallel to the vessel axis and passing through the center of gravity 21 of the mass of clamp 11 will pass substantially through the geometric center of bosses 13. Similarly, bosses 14 are so placed that a similar plane 22 disposed normal to spindles 16 and passing through the center of gravity 21 of the mass of clamp 12 will pass substantially through the geometric center of bosses 14. By placing each pair of bosses mutually in a plane passing through the center of gravity of the respective clamp, a balanced support or suspension of clamps 11 and 12 on spindle 16 is obtained at all times, regardless of the position of vessel 1. Such balanced support prevents the tendency of the clamps to move out of a plane transverse to the vessel when the latter is in a position other than horizontal. There is thus no tendency of clamps 11 and 12 to bind on spindles 16, as was the case heretofore. Opening and closing the end of the vessel is thereby facilitated.

Bosses 13 and 14 may be formed integral with their respective clamp members, or may be welded or otherwise secured thereto if desired. Opening and closing of clamps 11 and 12 may be effected by means other than threaded spindles without departing from the spirit of the invention.

The exact placement of the bosses will depend in each instance on the composition and actual construction of the particular clamp member, which in turn affect the center of gravity thereof.

Various modes of carrying out the invention are contemplated as being within the scope of the following claim particularly pointing out and distinctly claiming the subject matter which is regarded as the invention.

I claim:

A high pressure vessel comprising a vertically disposed cylindrical shell closed at one end and circumferentially flanged at the opposite end, a removable closure head for said flanged end having a complemental circumferential flange adjacent the flange of said shell, a pair of semi-circular channel shaped clamp members disposed on opposite sides of the vessel with said flanges received therein for securing said head to said shell, a pair of substantially horizontal threaded parallel spindles extending in a tangential direction on opposite sides of said shell and supported by bearing members projecting radially from the shell between the corresponding ends of said clamp members, and end bosses on said clamp members spaced from the free ends thereof and with the bosses of each clamp member threaded upon corresponding ends of said spindles whereby turning of the spindles in one direction of rotation effects simultaneous inward movement of the clamping members to locking position upon said shell and head flanges and turning of the spindles in the opposite direction of rotation effects simultaneous outward movement of the clamping members to release said head flange and thereby permit removal of said head from said shell, said end bosses of each clamp member being disposed geometrically centered with respect to a vertical plane containing the approximate center of mass of the corresponding clamp member and extending normal to said threaded spindles whereby binding of the threading action between said spindles and clamp members is reduced to a minimum when said clamp members are free from said flanges and supported solely by said threaded spindles.

References Cited in the file of this patent

UNITED STATES PATENTS

| | | |
|---|---|---|
| 2,166,999 | Needham et al. | July 25, 1939 |
| 2,338,622 | Cleveland et al. | Jan. 4, 1944 |